Dec. 5, 1967              J. A. GULOTTA              3,356,476
METHOD OF REMOVING CONTAMINATES FROM THE PROTECTIVE
ATMOSPHERE OF A GLASS SHEET FLOAT BATH
Filed Feb. 8, 1965              2 Sheets-Sheet 1
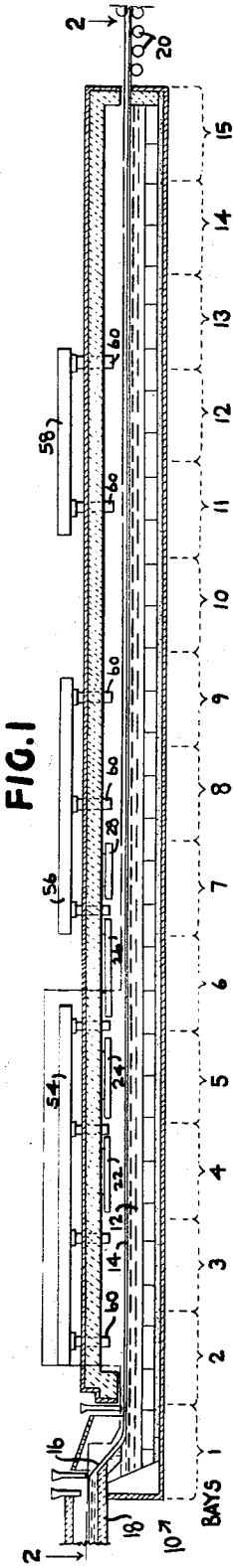
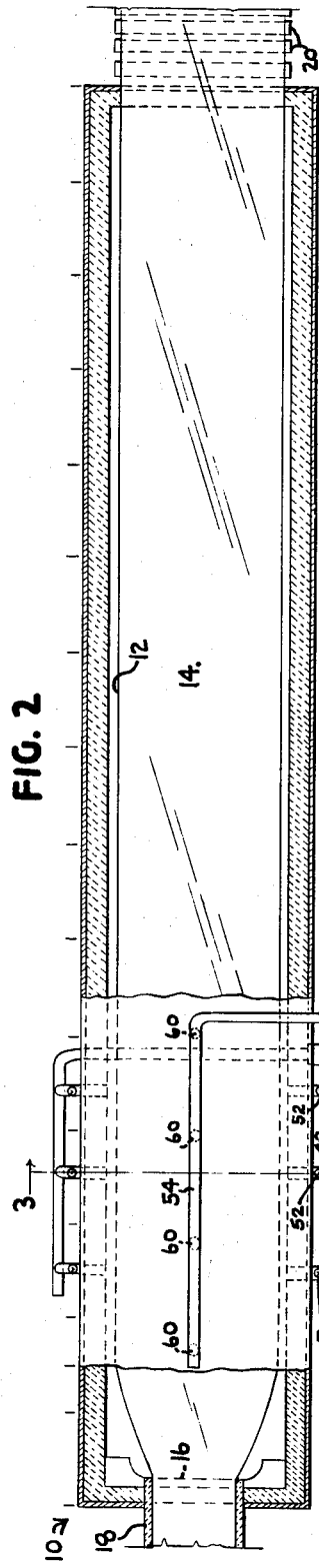
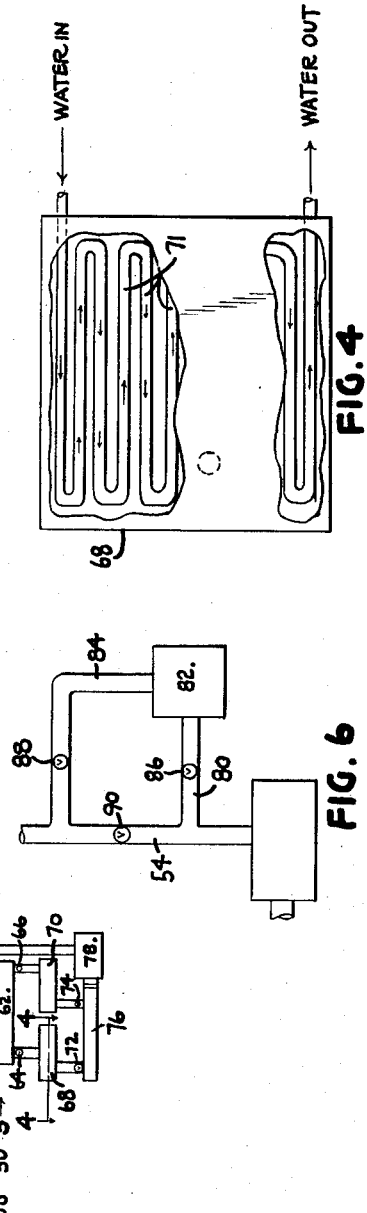
INVENTOR
JOSEPH A. GULOTTA
Chisholm and Spencer
ATTORNEYS

INVENTOR
JOSEPH A. GULOTTA

BY

ATTORNEYS

United States Patent Office 3,356,476
Patented Dec. 5, 1967

3,356,476
METHOD OF REMOVING CONTAMINATES FROM THE PROTECTIVE ATMOSPHERE OF A GLASS SHEET FLOAT BATH
Joseph A. Gulotta, New Kensington, Pa., assignor to Pittsburgh Plate Glass Company, Pittsburgh, Pa., a corporation of Pennsylvania
Filed Feb. 8, 1965, Ser. No. 430,996
6 Claims. (Cl. 65—27)

ABSTRACT OF THE DISCLOSURE

In the float glass process wherein a mass of glass is supported on a molten metal bath and is formed as a ribbon thereon, the bath is protected against oxidation by a controlled protective atmosphere thereover. The protective atmosphere becomes contaminated during the process. Accordingly, a substantial portion of the atmosphere is removed from above the bath, treated to remove the contaminates, and thereafter returned to above the bath. Treating may include cooling, passing over silica gel, etc.

---

This invention relates to improvements in the manufacture of float glass produced by floating a mass of glass on a bath of a molten liquid, such as tin or a tin alloy. The process for producing such glass is described in Pilkington U.S. Letters Patent No. 3,083,551. In this process a protective gaseous atmosphere is maintained over the bath of liquid. The atmosphere usually is nitrogen with a small percentage of hydrogen added.

In the aforementioned process, the ideal flat, perfect glass is not always obtained. For example, there are many defects which occur in the glass, one of which appears as indentations in the top surface of the glass, i.e., that surface not in contact with the molten liquid of the bath. These indentations are usually smooth and perfectly round, often with black specks in the glass near the center of the indentation. The indentations are generally about 0.005 inch in diameter and 0.002 inch deep.

The frequency of these indentations may be as high as 17 per square foot or above and is generally 3 per square foot. Because they affect the optical quality of the glass, especially if the glass is silvered, as in the manufacture of mirrors, it is desirable to materially reduce their frequency or eliminate them entirely. Their origin is not known.

In accordance with this invention, it has been found that the frequency of the top indentation defect can be materially reduced to a value below about 1 per square foot and usually below about 0.2 per square foot. This is accomplished by withdrawing a portion of the gaseous atmosphere from above the bath of liquid, preferably at or adjacent to a location where the temperature is the highest, treating such as cooling, the removed atmosphere, and thereafter reintroducing the treated atmosphere above said bath. The atmosphere may be reintroduced at or closely adjacent to the location of withdrawal or at another location. Also, the atmosphere may be withdrawn at any location above the bath, but preferably while at a high temperature.

It is possible to remove a substantial portion of other foreign material in gaseous form which may contaminate the gases over the bath of liquid. This is accomplished, preferably by treating the cooled gases by passing the gases over a bed of a material, such as silica gel, or by bubbling the cooled gases through a bath of a liquid material, such as molten tin.

Figure 3:
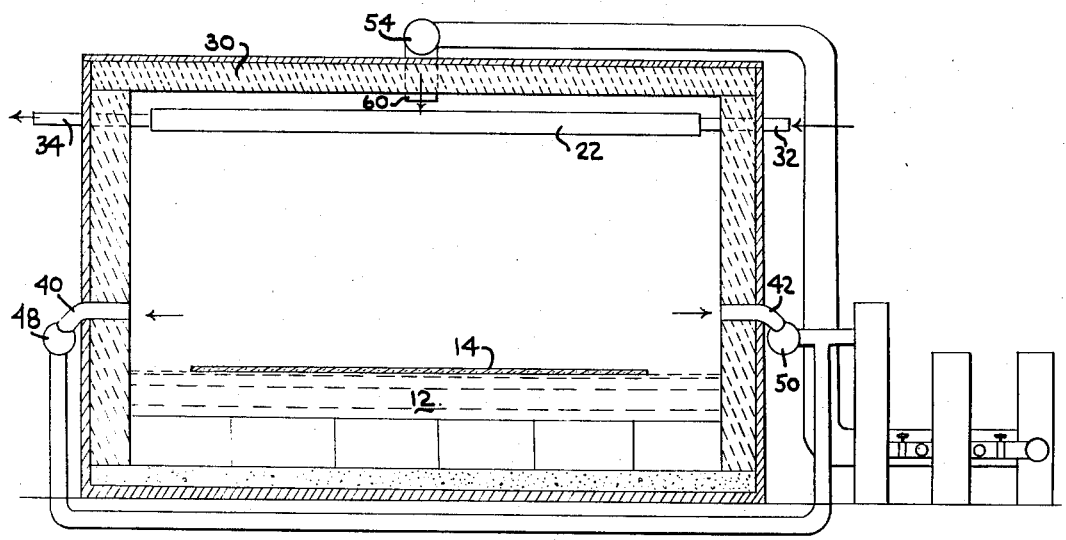
Figure 5:
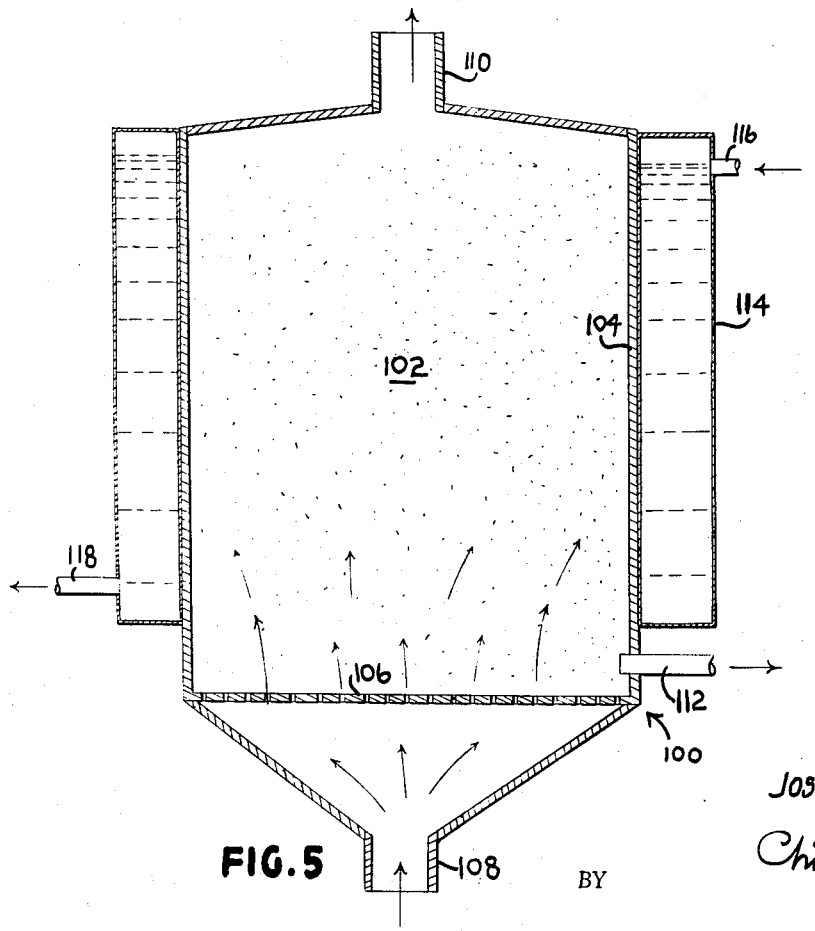

To more fully understand the invention, attention is directed to the accompanying drawings, in which FIG. 1 is a longitudinal sectional view of a typical float glass producing apparatus incorporating this invention;
FIG. 2 is a view taken on line 2—2 of FIG. 1;
FIG. 3 is a sectional view taken on line 3—3 of FIG. 2;
FIG. 4 is a sectional view taken on line 4—4 of FIG. 2;
FIG. 5 is a modification of apparatus suitable for cooling the removed atmosphere and adaptable for use in the practice of this invention; and
FIG. 6 is a partial view similar to FIG. 2 illustrating an additional gas treating means.

In the drawings, there is shown a tank 10 containing a bath of molten liquid 12, such as tin or a tin alloy, supporting a ribbon of glass 14 formed on the bath from molten glass delivered over a spout 16 from a glass melting tank 18. The ribbon of glass is removed from the bath on rolls 20 and conveyed into an annealing lehr (not shown). A gaseous atmosphere is maintained over the bath as will be described. Heating means (not shown) can be provided to maintain a desired temperature gradient from the entrance end of the bath to the exit end thereof. The above is conventional and is taught by the aforesaid Pilkington patent.

For convenience, the bath is divided into a number of zones, identified as bays 1 to 15 on FIGS. 1 and 2 of the drawing and referred to in a like manner hereinafter. The highest temperatures occur in bay 1 while the lowest temperatures occur in bay 15. Of course, the bath could be divided into a greater or lesser number of bays, if desired.

In certain of the bays, coolers are provided for adjusting the temperature within the tank, and such coolers may be provided in addition to or instead of heaters if found necessary or desirable. For example, coolers 22, 24, 26 and 28 are illustrated as being located above the bath in bays 4, 5, 6 and 7 respectively. These coolers are suspended from the roof 30 of the tank 10 and have inlet and outlet pipes 32 and 34, respectively, (see FIG. 3), passing through the side walls of the tank for the inlet and discharge of a cooling fluid therethrough.

The treatment of the gaseous atmosphere is beneficial in that the coolers remain substantially clean and free of deposits, so that they retain a substantially uniform cooling effect, i.e., their heat exchange property remains substantially constant.

In addition to the coolers, 22, et seq., which are provided for temperature conditioning of the atmosphere above the bath, there are outlet pipes 36, 38, 40, 42, 44 and 46 passing through the side walls of the tank for the withdrawal of gaseous atmosphere from above the bath. The pipes 36 and 38 are illustrated at bays 3, the pipes 40 and 42 at bay 4 and the pipes 44 and 46 at bay 5. The pipes are joined by headers 48 and 50, respectively and valves 52 are interposed in each pipe, so that it is possible to select a particular zone from which the atmosphere is withdrawn.

The protective gaseous atmosphere, as stated before, is generally nitrogen with a small quantity of hydrogen added, and is introduced through inlet headers 54, 56 and 58 having attached pipes 60 passing through the roof of the tank 10. These headers are suitably connected to a source of gas so that the atmosphere above the bath can be maintained slightly above atmospheric pressure, s for example 0.2 inches water above atmospheric pressure, to prevent the ingress of air into the tank. The gas introduced is substantially free of contaminants.

The header 54 is, in the embodiment illustrated, connected in a manner to be explained, to the source of the cooled, treated, gaseous atmosphere to be reintroduced above the bath.

Each header 48 and 50 is joined to a manifold 62 which is connected through suitable valves 64 and 66 to cooling or condensing units 68 and 70, respectively, which are, in turn, connected through suitable valves 72 and 74 to the inlet 76 of a blower unit 78. The blower unit 78 is connected to the aforementioned header 54.

The condensing units 68 and 70 (see FIG. 4) are conventional in construction and each contain a plurality of passes of a pipe 71 through which a cooling fluid, such as water is run. The withdrawn gases flow across the solid surfaces of the cooled pipes and any volatiles therein are condensed onto the pipes or fall to the floor of the unit. Preferably two such units are provided; permitting cleaning of one unit with continued operation of the other unit.

The blower 78 is conventional in design and has a capacity sufficient to withdraw the gases, carry the gases through a condensing unit where they are cooled, and then reintroduce the gases into the space above the bath. The various valves described are operated in accordance with the desired location of gas withdrawal and the operating condenser unit.

It has been found that the gases can be cooled to about 200° F. and thereafter reintroduced into the tank above the bath without harmful effects on the process; however, it also has been determined that cooling below about 600° F. is generally unnecessary because the majority of volatiles in the withdrawn gases are condensed into solid form at such temperatures.

There is other foreign material in gaseous form in the atmosphere which can be removed, preferably after the withdrawn gases are cooled. To accomplish the removal of the gaseous contaminents, the cooled gases are passed over or through a bed of silica gel or bubbled through a molten metal bath such as a bath of molten tin. FIG. 6 illustrates apparatus for removal of gaseous contaminants, which includes an inlet conduit 80 from the header 54, a treating tank 82, which can be a container for silica gel or a bath of molten tin, and an outlet conduit 84 back into the header 54. The treating material, is silica gel, is replaced at intervals of time, while molten metal can be skimmed of dross as required. Suitable valves 86 and 88 are provided in the conduits 80 and 84 and a valve 90 is provided in the header 54 to lend flexibility to the system.

Attention is now directed to FIG. 5 of the drawings illustrating an alternative condensing system which, when used, replaces the condenser units 68 and 70. This condensing unit, generally identified as 100 utilizes a fluidized bed 102, preferably of tin particles of 1/16 to 1/2 inch diameter, although particles of other materials could be used, contained within a shell 104 having therein a perforated plate 106 for supporting the particles. The lower portion of the shell 104 is funnel shaped and terminates in an inlet 108 which is connected to the manifold 62 for use. The top of the shell 104 terminates in another funnel shaped portion and an outlet 110 for the supply of cooled gases. In use, the outlet 110 is connected to the blower 78. Volatiles which condense onto the solid particles of the bed 102 drop off because of the movement of the particles and are removed from the side of the shell by means of removal pipe 112. To cool the particles of the bed, the shell is surrounded by a jacket 114 through which a cooling fluid, such as water, is circulated. Inlet and outlet pipes 116 and 118 are provided for this purpose.

Generally, in making a ribbon of soda-lime-silica glass of a composition similar to plate glass, 50 to 150 inches in width and a thickness of .08 to 0.350 inch on a bath of molten tin contained in a tank 230 inches wide and 150 feet long, the temperature varies from 2100° F. at the glass inlet end to 1000° F. at the exit end. The protective atmosphere contains 90 to 99.9% nitrogen and the remainder hydrogen and is maintained at a pressure of .1 to .5 inch water absolute, and sufficient to prevent the entry of ambient air into the tank above the bath. Generally, about 30,000 cubic feet of gas per hour at standard temperature (78° F.) and pressure (one atmosphere) is fed into the tank above the bath.

About one half that quantity of gas, i.e., 15,000 cubic feet per hour, is withdrawn and treated, as by cooling, to a temperature of 200° F. to 600° F. or above, for a period of time sufficient to remove the majority of volatiles and the thus treated gas is further treated to remove the gaseous contaminents. The gas is generally removed at a location where the bath temperature is 1200° F. to 1800° F. and is reintroduced at any location above the bath but generally closely adjacent to the location of withdrawal.

With such treatment, the frequency of the top indentations is materially reduced from as high as 17 per square foot to less than 1 per square foot and generally not more than 0.2 per square foot.

*Example*

A ribbon of glass 130 inches wide is formed to a thickness of 0.250 inch on a bath of molten tin contained within a tank 230 inches wide and 150 feet long. The temperature of the bath varies from 2100° F. to 1000° F. from one end to the other end. A protective atmosphere comprising 99% nitrogen and 1% hydrogen at a pressure of .2 inch $H_2O$ absolute is maintained over the bath at a rate of 30,000 cubic feet per hour and is fed thereon. The glass, after formation, is inspected and contains 35 defects per square foot in the top surface. The defects average .005 inch diameter and .001 inch deep.

About 25,000 cubic feet per hour of the gaseous atmosphere is withdrawn from above the bath at a location where the temperature is 1700° F. and is passed through a condensing unit having 600 feet of 1 inch pipe through which water at an initial temperature of 90° F. and an outlet temperature of 140° F. at a rate of 30 gals./min. is flowing.

The gas at a temperature of 200° F. is reintroduced above the bath at a location where the temperature is 1600° F. After a period of 2 hours, the frequency of the defects is .02 per square foot of glass.

I claim:

1. In the method of producing glass wherein a mass of glass is supported on a bath of molten metal over which a protective atmosphere is maintained, which atmosphere becomes contaminated with gaseous contaminates, the improvement comprising:
    withdrawing a substantial portion of said contaminated atmosphere from over said bath,
    cooling the withdrawn atmosphere for a time sufficient to condense contaminates therein,
    removing the condensed contaminates from said withdrawn atmosphere to clean said withdrawn atmosphere, and
    thereafter reintroducing said cooled and cleaned protective atmosphere over said bath of molten metal.

2. A method as recited in claim 1, further including passing said cooled atmosphere over a bed of silica gel to remove other contaminates therefrom.

3. A method as recited in claim 1 further including bubbling said cooled atmosphere through a liquid bath to remove other contaminates therefrom.

4. The method as recited in claim 1 wherein said withdrawn atmosphere is cooled by being passed through a bed of fluidized particles.

5. In the method as recited in claim 3, wherein the liquid bath is molten tin.

6. In the method as recited in claim 1, wherein the atmospheres are removed at a temperature of 1200° F. to 1800° F. and are reintroduced at a temperature of 200° F. to 600° F.

References Cited

UNITED STATES PATENTS

| 1,844,851 | 2/1932 | Harmon | 55—95 X |
| 1,994,515 | 3/1935 | Hausen et al. | 165—3 X |
| 2,694,272 | 11/1954 | Spengler | 65—27 X |
| 2,911,759 | 11/1959 | Pilkington | 65—32 |

DONALL H. SYLVESTER, *Primary Examiner.*

ARTHUR D. KELLOGG, *Examiner.*